(12) United States Patent  (10) Patent No.: US 7,941,104 B2
Lim et al.  (45) Date of Patent: May 10, 2011

(54) DIVERSITY TRANSMISSION METHOD AND TRANSMITTER OF A BASE STATION USING THE SAME IN A MOBILE COMMUNICATION SYSTEM

(75) Inventors: Kwang-Ja Lim, Daejeon (KR); Chul-Sik Yoon, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd, Seoul (KR); Hanaro Telecom, Inc., Seoul (KR)

( * ) Notice: Subject to any disclaimer, the term of this patent is extended or adjusted under 35 U.S.C. 154(b) by 649 days.

(21) Appl. No.: 11/915,033

(22) PCT Filed: Nov. 2, 2005

(86) PCT No.: PCT/KR2005/003661
§ 371 (c)(1), (2), (4) Date: Nov. 20, 2007

(87) PCT Pub. No.: WO2006/137627
PCT Pub. Date: Dec. 28, 2006

(65) Prior Publication Data
US 2008/0214128 A1    Sep. 4, 2008

(30) Foreign Application Priority Data
Jun. 24, 2005  (KR) .................. 10-2005-0054863

(51) Int. Cl.
*H04B 7/02* (2006.01)
*H04K 3/00* (2006.01)

(52) U.S. Cl. .................... 455/101; 455/69; 455/522
(58) Field of Classification Search .................. 455/69, 455/101, 127.1, 522
See application file for complete search history.

(56) References Cited

U.S. PATENT DOCUMENTS
6,424,679 B1   7/2002 Dabak et al.
7,444,161 B2 * 10/2008 Cao et al. ................. 455/522
(Continued)

FOREIGN PATENT DOCUMENTS
EP    1133073 A1    9/2001
(Continued)

OTHER PUBLICATIONS

Liang Xian et al., "An Adaptive Power Allocation Scheme for Space-time Block Coded MIMO Systems", 2005 IEEE Wireless Communications and Networking Conference, Mar. 13-17, 2005, pp. 504-508, vol. 1.

(Continued)

*Primary Examiner* — Lee Nguyen
(74) *Attorney, Agent, or Firm* — Jefferson IP Law, LLP (57) ABSTRACT

A diversity transmission method and a transmitter of a base station using the same is provided in a mobile communication system. For this purpose, the diversity transmission method for controlling power of transmit antennas when the transmitter transmits a signal to a mobile terminal using a plurality of antennas includes (a) receiving feedback information concerning the antenna having the best channel status from the mobile terminal, (b) increasing power allocation of a selected antenna according to the feedback information by a predetermined amount and decreasing power allocation of a non-selected antenna by a predetermined amount, and (c) transmitting the signal to the mobile terminal using the power allocation controlled in (b).

20 Claims, 6 Drawing Sheets

U.S. PATENT DOCUMENTS

| | | |
|---|---|---|
| 2002/0018530 A1 | 2/2002 | Kim et al. |
| 2003/0013476 A1 | 1/2003 | Park et al. |
| 2003/0162511 A1 | 8/2003 | Kim et al. |
| 2004/0077378 A1 | 4/2004 | Kim et al. |
| 2004/0127175 A1 | 7/2004 | Lucidarme et al. |
| 2004/0235526 A1 | 11/2004 | Kaipainen et al. |
| 2004/0266471 A1 | 12/2004 | Boariu et al. |

FOREIGN PATENT DOCUMENTS

| | | |
|---|---|---|
| KR | 1020000001796 A | 1/2000 |
| KR | 1020030070714 A | 9/2003 |
| KR | 1020040003537 A | 1/2004 |
| KR | 1020050020133 A | 3/2005 |
| WO | 2004/062134 A1 | 7/2004 |

OTHER PUBLICATIONS

F Tong, et al., "Optimal Transmission Scheme for a Distributed Antenna in CDMA System", Fifth IEEE International Conference on 3G Mobile Communication Technologies, 2004, pp. 600-303.

* cited by examiner

DIVERSITY TRANSMISSION METHOD AND TRANSMITTER OF A BASE STATION USING THE SAME IN A MOBILE COMMUNICATION SYSTEM

TECHNICAL FIELD

The present invention relates to a diversity transmission method and a transmitter of a base station used in a mobile communication system. More particularly, the present invention relates to a diversity transmission method for controlling power allocation of antennas according to feedback information of a mobile terminal in a mobile communication system, and a transmitter of a base station using the same.

BACKGROUND ART

Generally, a transmitter of a wireless base station (BS) may include a plurality of antennas to obtain antenna diversity, and thus enhance reliability of the signal received at the mobile terminal in the mobile communication system.

Such methods for supporting antenna diversity between the mobile terminal and the transmitter are currently classified into three types, an open loop transmit antenna diversity method, a closed loop adaptive antenna diversity method, and a transmit antenna selection diversity method.

Figure 1:
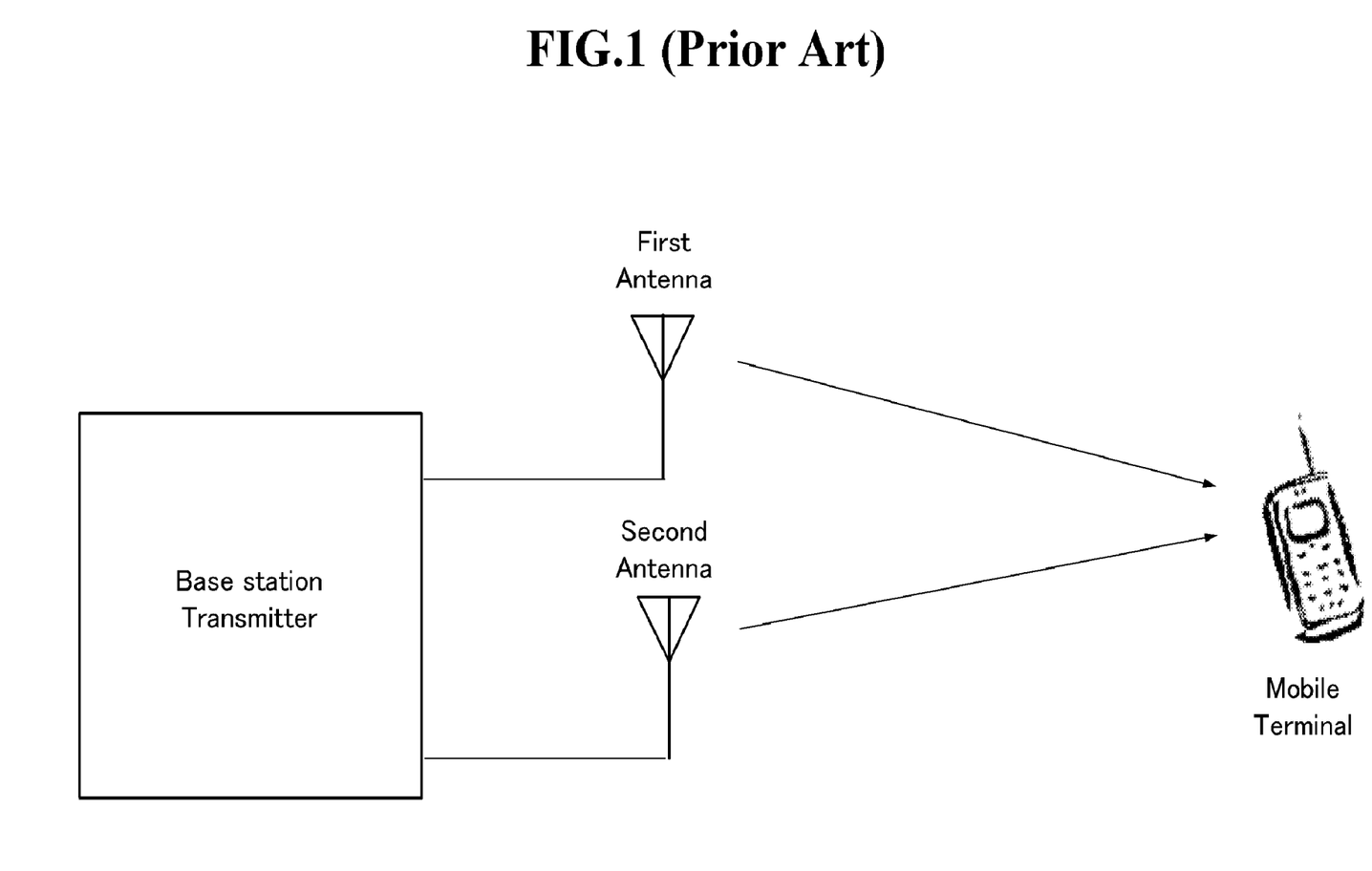
FIG. 1 to FIG. 3 are schematic views for describing a method for transmitting a signal according to the conventional diversity scheme.

FIG. 1 is a schematic view for explaining of an open loop transmit antenna diversity method.

The open loop transmit antenna diversity method supports a diversity gain using two transmit antennas at the transmitter of the base station in a forward link with which the transmitter transmits a signal to the mobile terminal. Also, the open loop transmit antenna diversity method uses a 2×2 Space-Time Block Code (STBC) transmit matrix based on the Alamouti scheme. The transmit matrix is given as the following Equation 1.

$$\begin{bmatrix} s_1 & s_2 \\ -s_2^* & s_1^* \end{bmatrix} \quad \text{(Equation 1)}$$

A diversity transmission method and a transmitter of a base station using the same is provided in a mobile communication system. For this purpose, the diversity transmission method for controlling power of transmit antennas when the transmitter transmits a signal to a mobile terminal using a plurality of antennas includes (a) receiving feedback information concerning the antenna having the best channel status from the mobile terminal, (b) increasing power allocation of a selected antenna according to the feedback information by a predetermined amount and decreasing power allocation of a non-selected antenna by a predetermined amount, and (c) transmitting the signal to the mobile terminal using the power allocation controlled in (b).

In Equation 1, $s_1$ and $s_2$ are defined as data symbols to be transmitted at time slots 1 and 2, respectively. Also, a row is defined as a data symbol respectively transmitted from a first antenna or a second antenna, and a column is defined as a data symbol transmitted for the time slots respectively. The column may use a physically independent radio resource such as a frequency (or subcarrier) or a code as well as the time slot.

For example, when channel responses for the first and second antennas at the mobile terminal are given as $h_1$ and $h_2$, and signals that the mobile terminal respectively receives at time 1 and time 2 are given as $r_1$ and $r_2$, the received signals $r_1$ and $r_2$ are explained as follows.

$$r_1 = h_1 s_1 + h_2 s_2$$

$$r_2 = -h_1 s_2^* + h_2 s_1^*$$

According to the open loop antenna diversity method of FIG. 1, the mobile terminal requests no feedback information so that an additional channel is not required for a reverse link (mobile-to-BS link). Also, mobility of the mobile terminal is fast so that a performance can be preserved regardless of a rapidly varying channel response. However, since an antenna weight value is not controlled according to the channel response, the open loop antenna diversity method cannot obtain array gain. Accordingly, the open loop antenna diversity method has a degraded performance at a low speed in comparison with the closed loop adaptive antenna diversity method or the transmit antenna selection diversity method.

Figure 2:
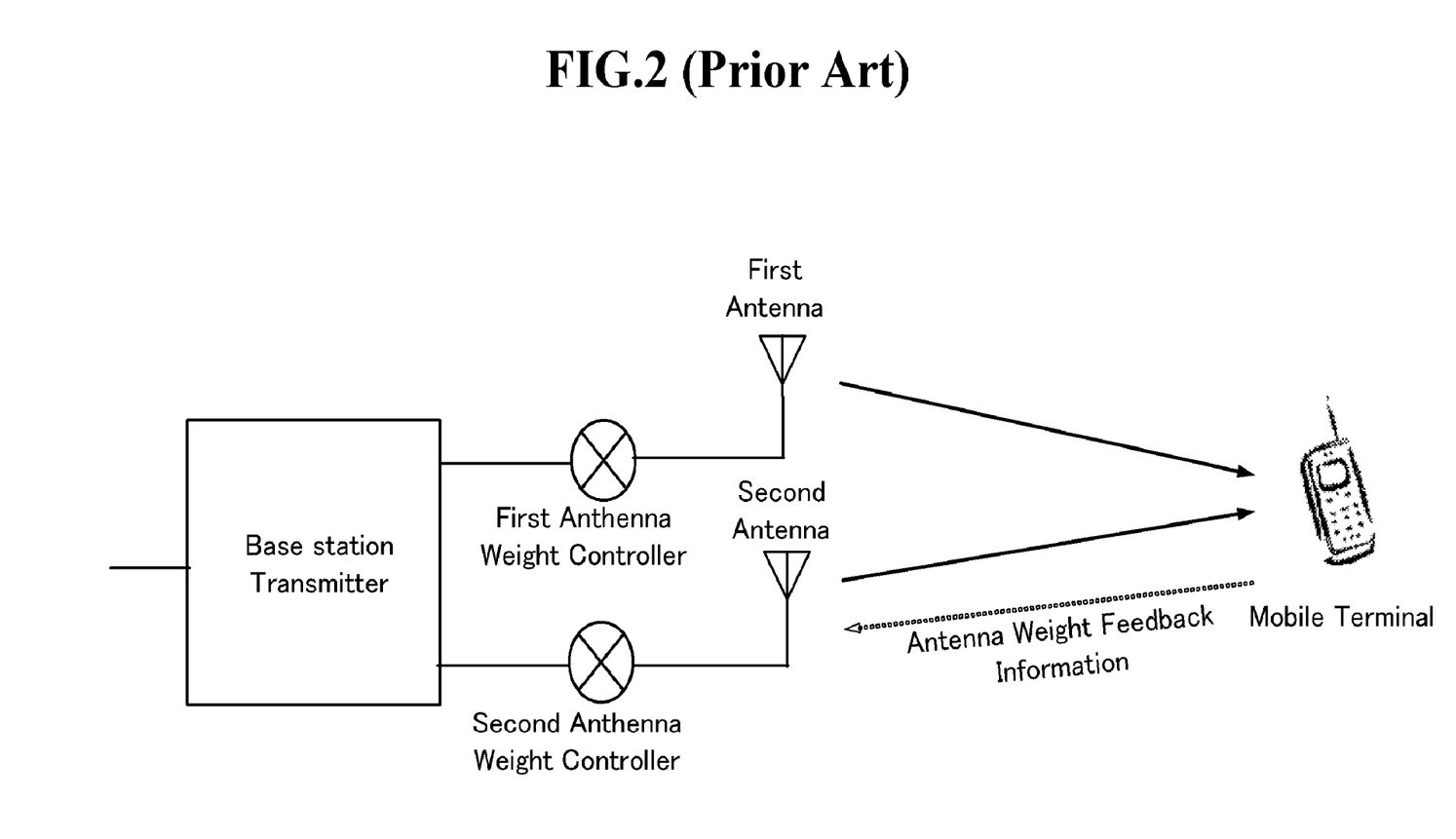

FIG. 2 is a schematic view for explaining a closed loop adaptive antenna diversity method.

In the closed loop adaptive antenna diversity method, the transmitter of the base station supplies the antenna array gain and the diversity gain for the mobile terminal by adjusting the antenna weights according to feedback information, when the mobile terminal measures a channel status for the respective transmit antennas and transmits the antenna weight value to the BS through the feedback channel of the reverse link.

For this purpose, a transmit matrix is given as the following Equation 2.

$$\begin{bmatrix} w_1 & s_1 \\ w_2 & s_2 \end{bmatrix} \quad \text{(Equation 2)}$$

That is, when the BS transmits the signals to the mobile terminal, a complex coefficient $w_i$ (i=1, 2) multiples with the respective signals for the respective antenna. In this case, the mobile terminal must estimate the antenna weight value for maximizing a received signal-to-noise ratio (SNR).

Accordingly, in order to adjust the antenna weights for transmitting signals on the forward link, the BS needs the feedback information supplied from the mobile terminal at the reverse link. Also, the mobile terminal must periodically transmit a few to tens of bits of feedback information to transmit detailed information concerning the complex weights $w_1$ and $w_2$ for the respective antennas through the feedback channel of the reverse link.

Figure 3:
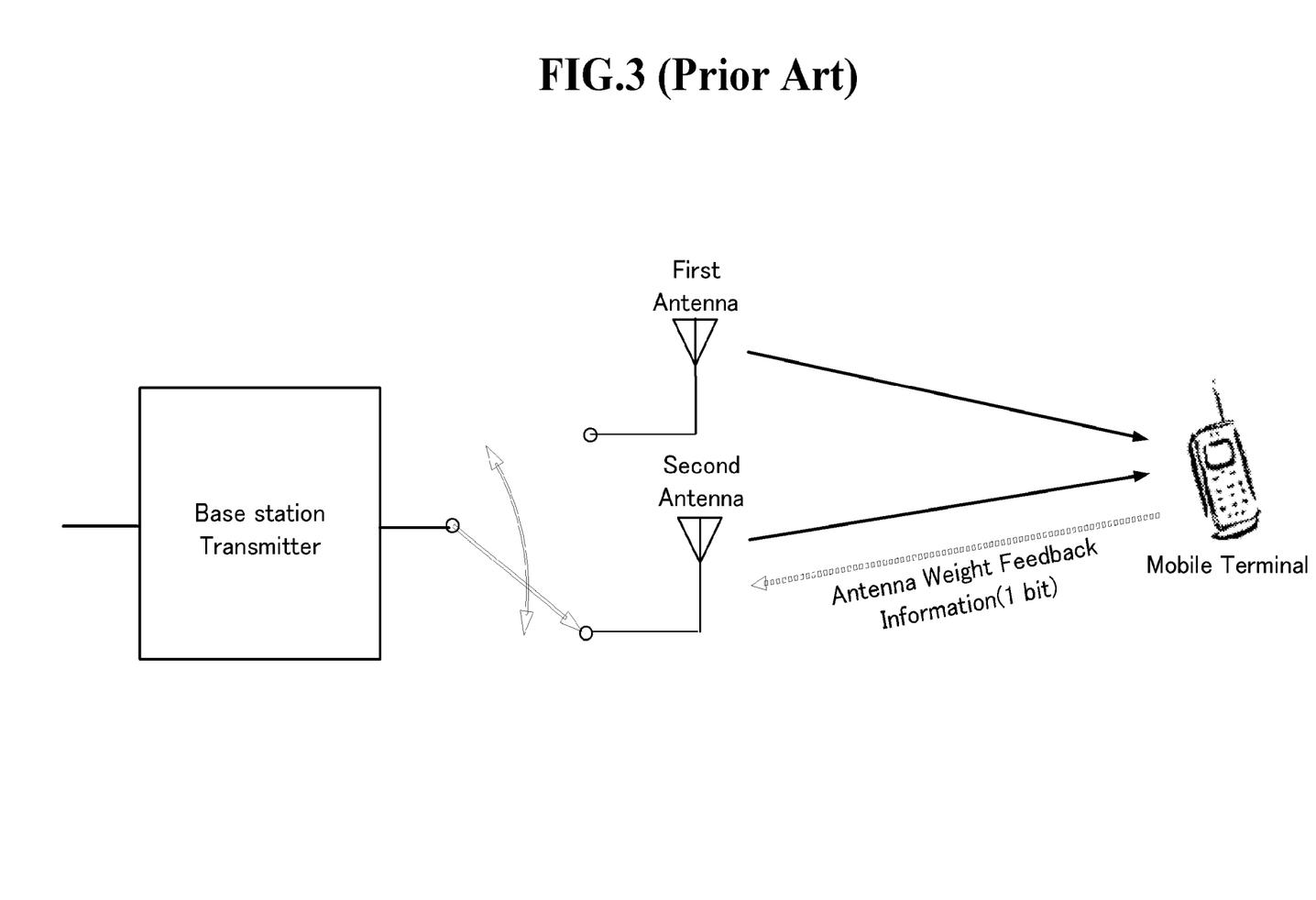

As such, since the mobile terminal transmits a large amount of feedback information through the feedback channel of a restricted transmission rate, the BS cannot cope with a rapid variation of the channel status when the mobile terminal speed is high. Accordingly, the closed loop antenna diversity method has a rapidly decreased performance at a high speed FIG. 3 is a schematic view for explaining a transmit antenna selection diversity method.

In the transmit antenna selection diversity method, so as to supply an antenna selection diversity gain, the mobile terminal measures the channel status for the respective antenna to select the most superior antenna and transmits the selection information through the feedback channel of the reverse link to the BS, and then, the BS transmits the signal through the selected antenna. For this purpose, a transmit matrix is given as the following Equation 3.

$$\begin{bmatrix} \alpha_1 & s_1 \\ \alpha_2 & s_2 \end{bmatrix} \text{ or } \begin{bmatrix} \alpha_1 s_1 & \alpha_1 s_2 \\ -\alpha_2 s_2^* & \alpha_2 s_1^* \end{bmatrix} \quad \text{(Equation 3)}$$

In Equation 3, $\alpha_i (i=1,2)$ is defined as an antenna selection value and is given as 0 or 1. According to the channel status, when the first antenna is selected, it is given as $\alpha_1=1$ and $\alpha_2=0$, and when the second antenna is selected it is given as $\alpha_1=0$ and $\alpha_2=1$.

Accordingly, the transmit antenna selection diversity method can reduce an amount of feedback information to be 1 bit when two transmit antennas are used. That is, the transmit antenna selection diversity method can remarkably reduce an amount of feedback information in comparison with the closed loop adaptive antenna diversity method.

However, in the transmit antenna selection method, a wrong antenna can be selected since it cannot cope with the rapid variation of the channel status when the mobility of the mobile terminal is greater than the feedback information transmission speed as in the close loop adaptive antenna diversity method. When the wrong antenna is selected, the mobile terminal may receive a signal through the antenna in which the signal is not substantially transmitted or the channel status is bad. Accordingly, the performance is degraded when the mobile speed is high or there is an error in the feedback information.

In order to solve these problems of the open-loop transmit antenna diversity method, the closed loop adaptive antenna diversity method and the transmit antenna selection diversity method used currently, Korean patent application No 2002-38274 entitled "Adaptive transmit antenna diversity method and apparatus in a mobile communication system" (2002.7.3), Korean patent application 1998-22220 entitled "Method and apparatus for controlling a power of a forward link using a transmit diversity in a mobile communication system" (1998.6.13), and Korean patent application 2002-10229 entitled "A forward channel status information transmitting/receiving method and apparatus for supporting an antenna selection diversity in a mobile communication system" (2002.2.26) and the like disclose various diversity methods. However, these prior arts have a possibility to generate very serious errors at a higher speed since they solve the problem of the diversity method at a low speed. In addition, these prior arts have a problem in that complicated calculation is performed at a mobile terminal and a large amount of feedback information is transmitted to the transmitter.

Thus, an antenna diversity method has been required to use less of the feedback information and to avoid a decrease of the performance when the mobility is increased.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a diversity transmission method and a transmitter of a base station using the same in a mobile communication system having advantages of using less feedback information, avoiding a decrease of the performance when the mobility is increased, and robustness to feedback errors. For this purpose, the BS uses a plurality of antennas to transmit signals and receives feedback information including the selection antenna information from the mobile terminal, increasing the power rate for the selected antenna, and decreases the power rate for the non-selected antenna.

Technical Solution

An exemplary diversity transmission method according to an embodiment of the present invention includes (a) receiving feedback information concerning the antenna having the best channel status from the mobile terminal, (b) increasing power allocation of a selected antenna according to the feedback information by a pre-determined amount and decreasing power allocation of a non-selected antenna by a predetermined amount, and (c) transmitting the signal to the mobile terminal using the controlled power by the power allocation controlled by (b) when the transmitter transmits a signal to a mobile terminal using a plurality of antennas.

A diversity transmission method for controlling the transmit power of transmit antennas when the BS transmits a signal to a mobile terminal using a plurality of antennas according to an embodiment of the present invention includes a feedback information checking unit for checking an antenna having the best channel status according to feedback information of the mobile terminal, a power allocation unit for increasing power allocation of an antenna having the best channel status checked by the feedback information by a predetermined amount and decreasing power allocation of an antenna not having the best channel status checked by the feedback information by a predetermined amount, and a power weight value controller for controlling a power of the signal transmitted through the plurality of antennas according to the controlled power allocation.

Advantageous Effects

As explained above, the transmitter of the base station uses a plurality of antennas to transmit signals and receives the feedback information of the signal including the selection antenna information from the mobile transmitter, increasing the power rate for the selected antenna and decreasing the power rate for the non-selected antenna. Accordingly, the diversity gain for enhancing the signal reception performance can be obtained at low and high mobility and the decrease of the performance due to the feedback information error can be avoided even under the rapid channel variation environment. Also, since the feedback information is transmitted through a small bit number, the information can be quickly transmitted and the antenna can be quickly converted between the mobile terminal and the transmitter.

MODE FOR THE INVENTION

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 4:
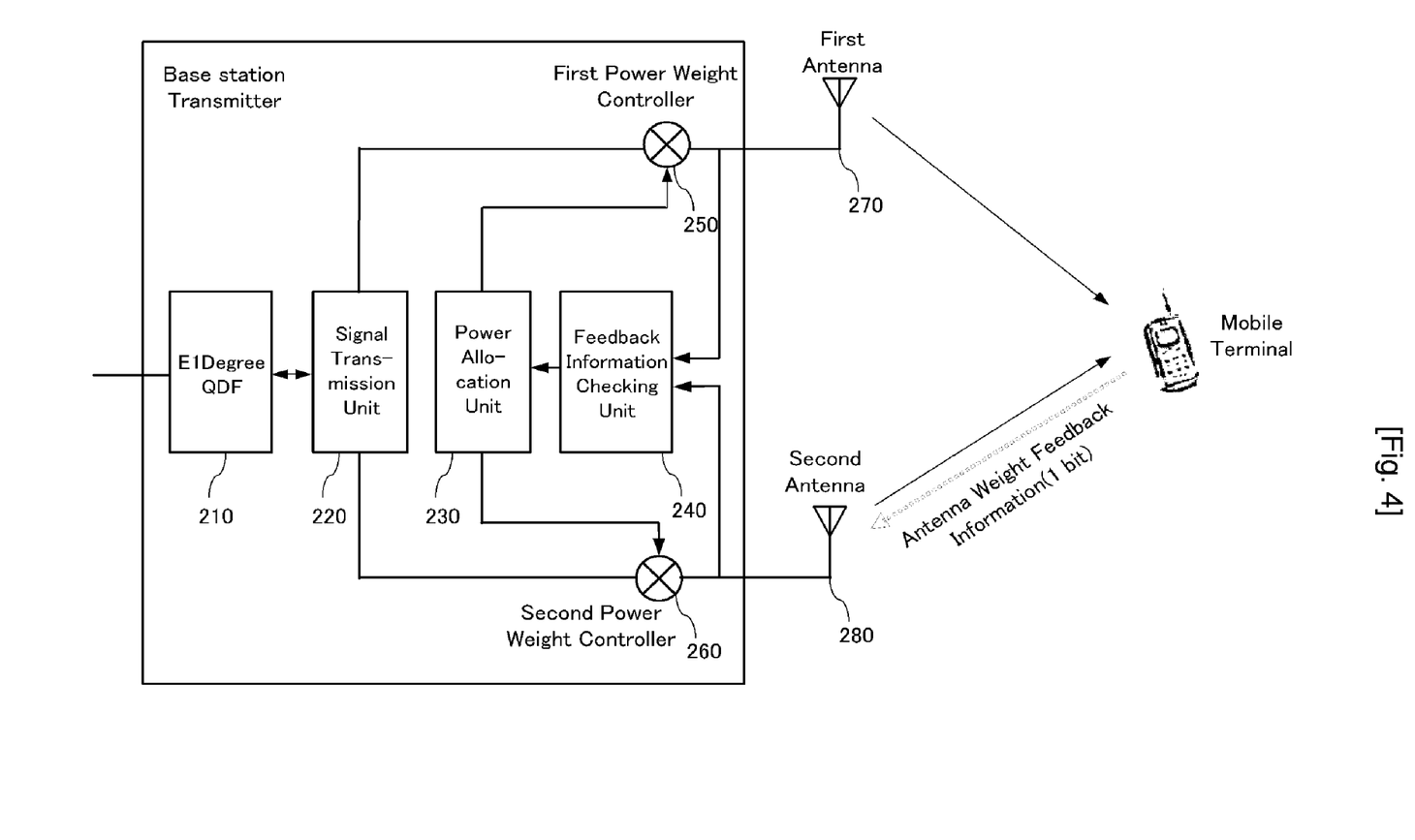
FIG. 4 is a schematic view for explaining a method for transmitting a signal by a transmit antenna diversity method controlling power allocation according to an exemplary embodiment of the present invention.

FIG. 4 is a schematic view for explaining a method for transmitting a signal by a transmit antenna diversity method for controlling power allocation according to an exemplary embodiment of the present invention, In a transmit antenna diversity scheme for controlling power allocation according to an exemplary embodiment of the present invention, a transmitter of a base station includes an external device 210, a signal transmission unit 220, a power allocation unit 230, a feedback information checking unit 240, a first power weight value controller 250, a second power weight value controller 260, a first antenna 270, and a second antenna 280. The transmitter may include two or more power weight value controllers and antennas. However, in this embodiment, two antennas are used.

The external device may be a controller of the base station or a quick distribute frame (QDF) of an exchanger). Accordingly, the external device can receive a signal from the controller or the exchanger and transmit the signal to the same so as to upload a signal transmitted from a mobile terminal. Generally, the QDF is a connecting terminal used to connect with the external device. The external device 210 of the transmitter is connected one to one with a QDF of the controller or exchanger through a jumper. Conventionally, the jumper used is an E1 degree cable or a T1 degree cable so as to transmit a large volume of voice signals and data.

The signal transmission unit 220 transmits the signal received through the external device 210 to the antennas 270 and 280, or transmits the signal received through antennas 270 or 280 to the external device 210 from the mobile terminal. Of cause, a transmit antenna may be different from a receive antenna. In order to transmit the signal to the mobile terminal using the power allocation diversity method, the signal transmission unit 220 transmits the signal through the first power weight value controller 250 or the second power weight value controller 260 to the first antenna 270 and the second antenna 280.

The power allocation unit 230 controls power allocations for decreasing or increasing the power supplied to the first antenna 270 and the second antenna 280 according to the feedback information.

The feedback information checking unit 240 checks the feedback information received through the first antenna 270 and the second antenna 280 and transmits the information of the antenna having a superior channel status to the power allocation unit 230.

The first power weight value controller 250 controls a supply of power of the first antenna 270 according to the power allocation transmitted from the power allocation unit 230, and the second power weight value controller 260 controls a supply of power of the second antenna 280 according to the power allocation.

The first antenna 270 and the second antenna 280 transmit the voice signal or data to the mobile terminal, and receive antenna selection feedback information from the mobile terminal feedback information to transmit the same to the checking unit 240.

The power allocation diversity method using the above-structured transmitter uses the same feedback information as in the transmit antenna selection diversity method to control the power allocation supplied to the respective antennas 270 and 280. That is, the mobile terminal selects the antenna having the best channel characteristic as the transmit antenna selection diversity method and transmits the antenna information through 1 bit feedback information to the transmitter. The feedback information checking unit 240 checks the feedback information, and the power allocation unit 230 increases a supply of power for the selected antenna and decreases a supply of power for the non-selected antenna by a predetermined amount.

Accordingly, when the mobile terminal is slow, that is, the channel variation is slow, the mobile terminal may continuously select the same antenna of the transmitter during a predetermined time. The power allocation unit 230 continuously increases the power ratio of the selected antenna and decreases the power ratio of the non-selected antenna so that the BS allocates most of the power to the selected antenna. Accordingly, when the mobile terminal is slow, a selection diversity gain can be obtained similarly to the transmit antenna selection diversity method of FIG. 3.

Meanwhile, when the mobile terminal is fast, that is, the channel variation is fast, the mobile terminal alternately may select the first antenna 270 and the second antenna 280. Accordingly, the power allocation unit 230 supplies the power to the two antennas 270 and 280 at approximately the same power ratio. When the mobile terminal is fast, the diversity gain can be obtained similarly to the open loop transmit antenna diversity method of FIG. 1.

In addition, when there is an error of the feedback information transmitted from the mobile terminal, the power can be reallocated according to the erroneous feedback information when the power allocation unit 230 increases the power ratio of the non-selected antenna. In the power allocation diversity method, of the transmit power is not concentrated on only one antenna but is allocated at a predetermined rate for the respective antennas. Thus, when the error is generated, the power allocation ratios are slightly varied and thus, there is no serious performance degradation due to the erroneous feedback. As a result, as long as the feedback information consecutively has no errors, performance degradation due to the error of feedback information does not occur.

A transmit matrix of the power allocation diversity method according to an exemplary embodiment of the present invention is given as the following Equation 4.

$$\begin{bmatrix} \beta_1 s_1 & \beta_1 s_2 \\ -\beta_2 s_2^* & \beta_2 s_1^* \end{bmatrix}, \text{ where } \beta_1^2 + \beta_2^2 = 1 \quad \text{(Equation 4)}$$

In Equation 4, $\beta_i$(i=1,2) is defined as a power ratio for the respective antennas and is given as a real number of 0 to 1.

Figure 5:
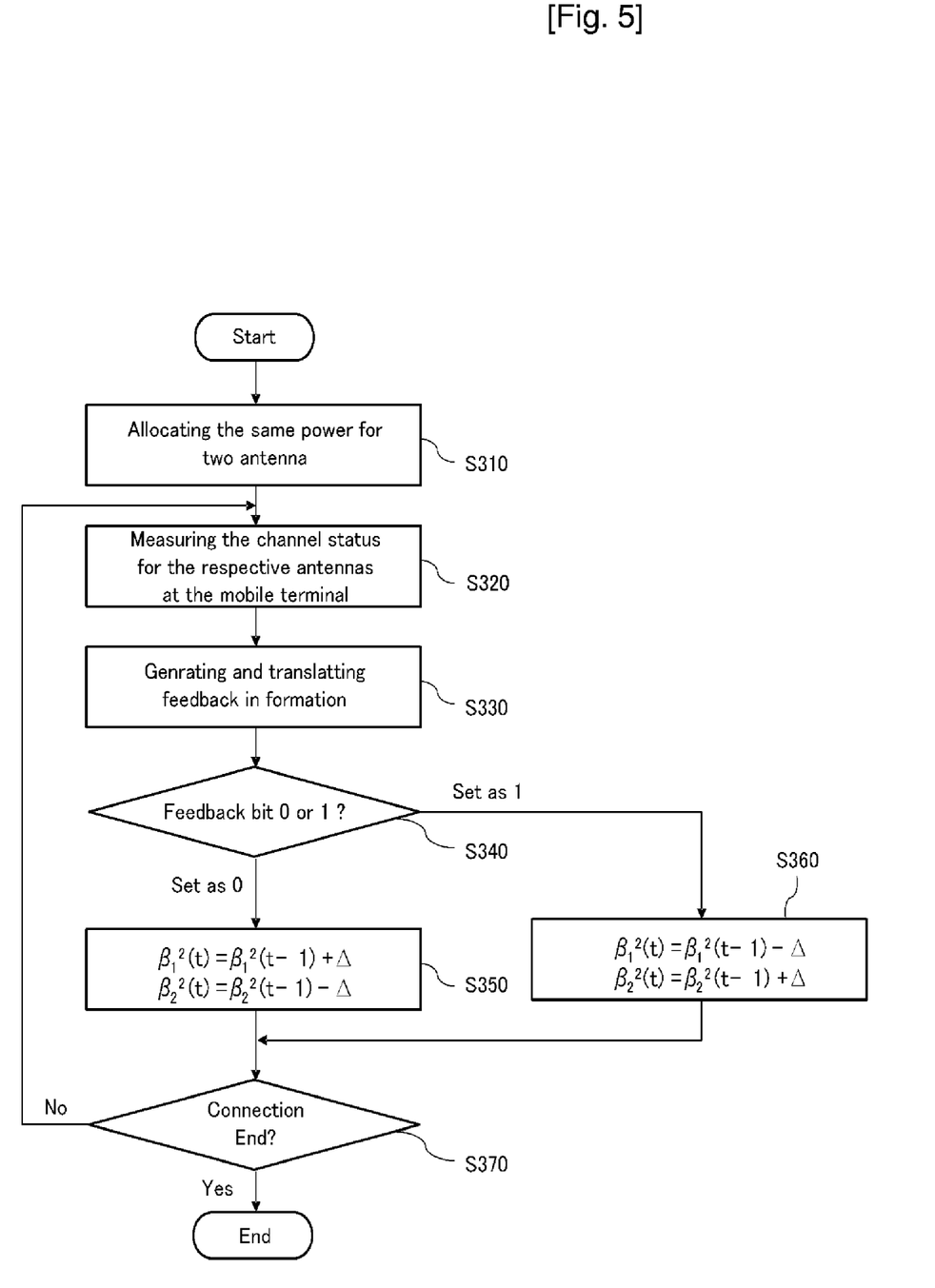
FIG. 5 is a flowchart for explaining a transmit antenna diversity method for controlling power allocation according to an exemplary embodiment of the present invention.

FIG. 5 FIG. 4 flowchart for explaining a transmit antenna diversity method for controlling power allocation according to an exemplary embodiment of the present invention.

When the feedback information is not transmitted from the mobile terminal, that is, initial time t=0, the power allocation unit 230 allocates the same power to the two antennas of the transmitter. That is, the initial power ratios for the antennas are set at $$\beta_1^2(0)=0.5 \text{ and } \beta_2^2(0)=0.5$$

(S310).

The mobile terminal measures the channel status for the respective antennas through the forward link (S320). When the channel status of the first antenna is determined to be superior at a t−1 time, 1 bit length feedback information is given as "0" and is transmitted through the feedback channel to the BS. When the channel status of the second antenna is determined to be superior at a t−1 time, the 1 bit length feedback information is given as "1" and is transmitted to the BS (S330).

The BS checks whether the bit of the feedback information is "0" or "1" through the feedback information checking unit 240 (S340). When the feedback bit is detected as "0", that is, the first antenna is selected by the mobile terminal, the power allocation unit 230 controls the respective power allocation at the time t as follows:

$$\beta_1^2(t)=\beta_1^2(t-1)+\Delta \text{ and } \beta_2^2(t)=\beta_2^2(t-1)-\Delta$$

wherein $\Delta$ is defined as a power adjust parameter and is given as $0<\Delta<1$. That is, the power supplied to the first antenna 270 is increased by a $\Delta$ value and the power supplied to the second antenna 280 is decreased by a $\Delta$ value (S350).

At step S340, when the feedback bit is detected as "1", that is, the second antenna is selected, the power allocation unit 230 controls the respective power allocation at the time t as follows:

$$\beta_1^2(t)=\beta_1^2(t-1)-\Delta \text{ and } \beta_2^2(t)=\beta_2^2(t-1)+\Delta$$

That is, the power supplied to the first antenna 270 is decreased by a $\Delta$ value and the power supplied to the second antenna 280 is increased by a $\Delta$ value (S360).

At the steps S350 and S360, the variation speed of the power ratio is controlled according to the power adjust parameter $\Delta$. For example, if the $\Delta$ is larger, a large amount of power variation is accomplished at once to rapidly cope with the rapid channel variation.

Through such power increasing/decreasing, the antenna selecting process and the signal transmission process between the selected antenna and the mobile terminal are consecutively performed after the step S320 until the connection is ended for the mobile terminal (S370).

When the mobile terminal receives the signals from the first antenna and the second antenna, the signals is respectively given as r1 and r2 and the channel response for the respective antennas is respectively given as h1 and h2, and a method for detecting the data symbol ($\hat{S}_1, \hat{S}_2$) for the respective antennas is given as the following Equation 5.

$$\hat{S}_1=\beta_1 h_1 r_1 + \beta_2 h_2 r_2$$

$$\hat{S}_2=\beta_2 h_2 r_1^* + \beta_1 h_1^* r_2 \quad \text{(Equation 5)}$$

When the mobile terminal receives the signal from the first antenna and the second antenna, the received signal-to-noise ratio (SNR) is calculated by the following Equation 6.

$$SNR = \frac{E_s}{N_o}(\beta_1^2|h_1|^2 + \beta_2^2|h_2|^2) \quad \text{(Equation 6)}$$

In Equation 6, $E_S$ is defined as transmission symbol energy, and $N_O$ is defined as noise power density.

When the channel status of the first antenna is superior such that the mobile terminal receives the signal through the first antenna, that is, $|h_1|^2>|h_2|^2$, the mobile terminal transmits the feedback information for selecting the first antenna and the transmitter increases the power ratio of the first antenna. Thus, the mobile terminal can obtain a higher received signal-to-noise ratio from the channel for the first antenna.

When the channel status of the second antenna is superior such that the mobile terminal receives the signal through the second antenna, that is, $|h_1|^2>|h_2|^2$, the mobile terminal transmits the feedback information for selecting the second antenna and the transmitter increases the power ratio of the second antenna. Thus, the mobile terminal can obtain a higher received signal-to-noise ratio from the channel for the second antenna.

Figure 6:
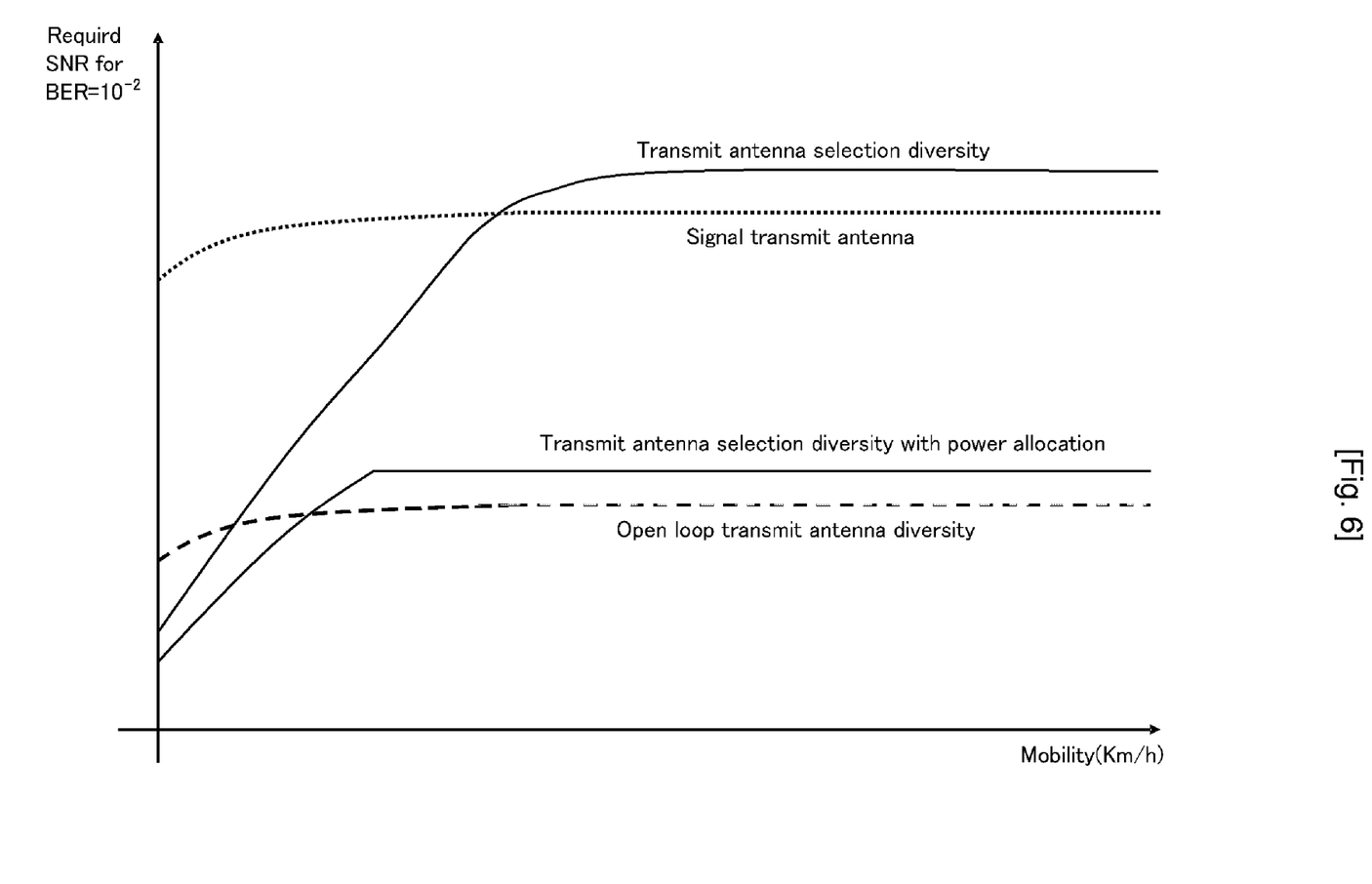
FIG. 6 is a graph of a received signal-to-noise ratio (SNR) satisfying required performance using a single antenna method, an open-loop transmit antenna diversity method, a transmit antenna selection diversity method, and a power allocation diversity method according to an exemplary embodiment of the present invention.

FIG. 6 is a graph of received signal-to-noise ratios (SNR) satisfying a required performance (e.g., a frame error rate or bit error rate of $10^{-2}$) using a single antenna method, an open-loop transmit antenna diversity method, a transmit antenna selection diversity method, and a power allocation diversity method according to an exemplary embodiment of the present invention.

When the SNR is given to be a smaller value in order that a Frame Error Rate (hereinafter called "FER") satisfies the specified value, the performance is determined to be better. Meanwhile, when the SNR is given to be a larger value, the performance is determined to be worse. That is, when the FER satisfies the specified values even at the small SNR FER, the performance can be considered to be superior. In FIG. 6, the respective SNRs satisfying a FER of $10^{-2}$ are displayed for the single antenna method, the open-loop transmit antenna diversity method, the transmit antenna selection diversity method, and the power allocation diversity method.

On comparing the performance at low mobility based on the open-loop transmit antenna diversity method, it is shown that the transmit antenna selection diversity method and the power allocation diversity methods are superior to the open-loop transmit antenna diversity method. Particularly, it can be shown that the power allocation diversity method is superior to the transmit antenna selection diversity method due to the robustness to erroneous feedback.

In the method for using a single antenna, the diversity gain cannot be obtained and the higher SNR is required so as to satisfy the required performance at a low speed. Accordingly, it can be shown that the performance is inferior.

The transmit antenna selection diversity method selects the wrong (that is, bad-conditioned) antenna according to the increase of the mobility to have a performance approaching that of the single antenna due to the decrease of the selection diversity gain.

In the power allocation diversity method, the performance is decreased according to the increase of the mobility to require a higher SNR than the open-loop transmits antenna diversity method. However, at a higher mobility than the specified value, the performance approaches that of the open-loop transmit antenna diversity method according to the increase of the mobility in comparison with the transmit antenna selection diversity method. Accordingly, it can be shown that the power allocation diversity method has superior performance at the higher mobility, although not that of the open-loop transmit antenna diversity method.

The mobile terminal may selectively use the transmit antenna selection diversity method and the open loop transmit antenna diversity method according to the mobility so as to have good performance. However, since the diversity method must be changed according to the mobility, it is very complicated. With the power allocation diversity method according to the embodiment of the present invention, the signal transmission performance can be easily enhanced without any change of the diversity method.

In FIG. 6, a graph of the SNRs satisfying a required performance may be varied according to the variables $a_i$, $w_i$, $\beta_i$, and $\Delta$ of the respective diversity methods.

In the embodiment, although the transmitter uses two antennas in which the diversity method according to the embodiment of the present invention is applied, three or more antennas can be obviously applied by a person skilled in the art. When a plurality of antennas is used, the feedback information is given as a plurality of bits rather than 1 bit. In addition, at a BS having n number of antennas, when the power allocation unit 230 increases the power allocation for the selected antenna by $\Delta$, the power allocations supplied to other antennas are respectively decreased by $$\frac{\Delta}{n-1}.$$

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A diversity transmission method for controlling a power of transmit antennas when a transmitter of a base station transmits a signal to a mobile terminal using a plurality of antennas, comprising:
  (a) receiving feedback information indicating an antenna comprising a best channel status from the mobile terminal;
  (b) selecting one antenna indicated by the feedback information of the plurality of antennas and increasing power allocation of the selected antenna by a first predetermined amount and decreasing power allocation of a non-selected antenna by a second predetermined amount; and
  (c) transmitting the signal to the mobile terminal using the controlled power by the power allocation controlled in (b).

2. The diversity transmission method of claim 1, further comprising before (a), allocating the same power to each of the antennas.

3. The diversity transmission method of claim 1, wherein it is checked whether the mobile terminal is connected, and (a) to (c) are repeated for respective pre-determined times when the mobile terminal is connected.

4. The diversity transmission method of claim 1, wherein in (a), the feedback information has 1 bit when the transmitter uses two antennas.

5. The diversity transmission method of claim 4, wherein when the power rates for the respective antennas are respectively given as real numbers $\beta_1$ and $\beta_2$ from 0 to 1, a transmit matrix is given as:

$$\begin{bmatrix} \beta_1 s_1 & \beta_1 s_2 \\ -\beta_2 s_2^* & \beta_2 s_1^* \end{bmatrix}, \text{ where } \beta_1^2 + \beta_2^2 = 1.$$

where $\beta_1^2 + \beta_2^2 = 1$.

6. The diversity transmission method of claim 5, wherein in (b), when a power allocation of the antenna increasing or decreasing by a pre-determined amount is given as $\Delta$, from 0 to 1, when the first antenna is selected by the feedback information, the power allocation is given as $\beta_1^2(t) = \beta_1^2(t-1) + \Delta$ and $\beta_2^2(t) = \beta_2^2(t-1) - \Delta$, and when the second antenna is selected by the feedback information, the power allocation is given as $\beta_1^2(t) = \beta_1^2(t-1) - \Delta$ and $\beta_2^2(t) = \beta_2^2(t-1) + \Delta$.

7. The diversity transmission method of claim 4, wherein when signals received from the first antenna and the second antenna are respectively given as $r_1$ and $r_2$ and channel responses for the respective antennas are respectively given as $h_1$ and $h_2$, the mobile terminal detects data symbols as follows:

$\hat{S}_1 = \beta_1 h_1 r_1 + \beta_2 h_2 r_2$ $\hat{S}_2 = \beta_2 h_2 r_1^* + \beta_1 h_1^* r_2$.

8. The diversity transmission method of claim 7, wherein when the transmission symbol energy is defined as $E_s$ and the noise power density is defined as $N_0$, the signal-to-noise ratio (SNR) is calculated as follows:

$\text{SNR} = E_s / N_0 (\beta_1^2 |h1|^2 + \beta_2^2 |h_2|^2)$.

9. The diversity transmission method of claim 1, wherein the selected antenna comprises the antenna comprising the best channel status.

10. The diversity transmission method of claim 1, wherein when the plurality of antennas comprises more than two (2) antennas, then the power allocation increase of the selected antenna comprises a sum of power allocation decreases of the non-selected antennas.

11. The diversity transmission method of claim 1, wherein when the plurality of antennas comprises more than two (2) antennas, then the power allocation of each non-selected antenna is decreased by the second predetermined amount.

12. The diversity transmission method of claim 11, wherein the power allocation increase of the selected antenna comprises a sum of power allocation decreases of the non-selected antennas.

13. The diversity transmission method of claim 1, wherein the feedback information comprises only feedback information concerning the antenna comprising the best channel status from the mobile terminal.

14. The diversity transmission method of claim 1, wherein the best channel status is determined by comparing a received Signal-to-Noise Ratio (SNR) of signals received from each antenna.

15. The diversity transmission method of claim 14, wherein the mobile terminal calculates the SNR of signals from each antenna, respectively.

16. The diversity transmission method of claim 14, wherein the best channel status corresponds to an antenna satisfying a predetermined Frame Error Rate (FER) value.

17. The diversity transmission method of claim 1, wherein the feedback information comprises a plurality of bits when the transmitter uses more than two antennas.

18. A transmitter for controlling power of a transmit antenna when the transmitter of a base station transmits a signal to a mobile terminal using a plurality of antennas, comprising:
- a feedback information checking unit for determining an antenna comprising the best channel status according to feedback information of the mobile terminal, wherein the feedback information comprises information indicating an antenna comprising a best channel status;
- a power allocation unit for increasing power allocation of the antenna comprising the best channel status indicated by the feedback information by a first predetermined amount and decreasing power allocation of an antenna not comprising the best channel status checked by the feedback information by a second predetermined amount; and
- a power weight value controller for controlling power of the signal transmitted through the antennas according to the controlled power allocation.

19. The transmitter of claim 18, wherein the power allocation is controlled according to the received feedback information for respective predetermined times.

20. The transmitter of claim 18, wherein when a transmitter comprises n antennas, the power allocation unit increases the power allocation for the selected antenna by $\Delta$, and decreases the power allocations supplied to other antennas by $\Delta/n-1$.

* * * * *